(12) United States Patent
Nakatsuka et al.

(10) Patent No.: US 10,202,121 B2
(45) Date of Patent: Feb. 12, 2019

(54) STOP CONTROL DEVICE

(71) Applicant: HONDA MOTOR CO., LTD., Tokyo (JP)

(72) Inventors: Masayuki Nakatsuka, Wako (JP); Kei Oshida, Wako (JP); Yukinori Kurahashi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 26 days.

(21) Appl. No.: 15/294,095

(22) Filed: Oct. 14, 2016

(65) Prior Publication Data

US 2017/0113688 A1    Apr. 27, 2017

(30) Foreign Application Priority Data

Oct. 21, 2015 (JP) .................................. 2015-207264

(51) Int. Cl.
*B60W 30/18* (2012.01)
*B60W 10/184* (2012.01)
(Continued)

(52) U.S. Cl.
CPC ........... *B60W 30/181* (2013.01); *B60K 28/06* (2013.01); *B60W 10/184* (2013.01);
(Continued)

(58) Field of Classification Search
CPC ....... B60W 2050/146; B60W 2710/06; B60W 2420/42; B60W 2510/0638;
(Continued)

(56) References Cited

U.S. PATENT DOCUMENTS 5,195,606 A * 3/1993 Martyniuk ................ B60T 7/02
                                                   180/272
5,775,456 A * 7/1998 Reppas ................. B60K 26/02
                                                   180/271
(Continued)

FOREIGN PATENT DOCUMENTS

JP    2002-19598 A    1/2002
JP    2005-271823 A   10/2005
JP    2011-57134 A    3/2011

OTHER PUBLICATIONS

Office Action dated Jul. 4, 2017, issued in counterpart Japanese Application No. 2015-207264, with English machine translation. (8 pages).
(Continued)

*Primary Examiner* — Courtney D Heinle
*Assistant Examiner* — Luis A Martinez Borrero
(74) *Attorney, Agent, or Firm* — Westerman, Hattori, Daniels & Adrian, LLP (57) ABSTRACT

An automatic stop controller (including a deceleration setting unit and a deceleration instruction unit) performs automatic stop control of a vehicle by using a first deceleration in response to (i) the detection or estimation of a stop intention by a stop intention detector or (ii) the detection or estimation of an unable-to-drive state of the driver of the vehicle by an unable-to-drive state detector while the vehicle is traveling. The automatic stop controller performs automatic stop control of the vehicle by using a second deceleration larger than the first deceleration in response to (i) the detection or estimation of the stop intention by the stop intention detector and (ii) the detection or estimation of the unable-to-drive state of the driver by the unable-to-drive state detector.

8 Claims, 6 Drawing Sheets

(51) Int. Cl.
*B60W 10/20* (2006.01)
*B60W 40/08* (2012.01)
*B60W 50/14* (2012.01)
*B60K 28/06* (2006.01)

(52) U.S. Cl.
CPC ............ B60W 10/20 (2013.01); B60W 40/08 (2013.01); B60W 50/14 (2013.01); *B60W 2040/0818* (2013.01); *B60W 2050/146* (2013.01); *B60W 2520/10* (2013.01); *B60W 2540/10* (2013.01); *B60W 2540/26* (2013.01); *B60W 2720/106* (2013.01)

(58) Field of Classification Search
CPC .......... B60W 30/18018; B60W 30/19; B60W 30/20; B60W 30/09; B60W 30/18; B60W 30/06; B60W 50/14; B60W 10/18; B60W 30/12; B60W 50/10; G08B 21/0269; G08B 21/0272; G08B 21/18; G08B 25/14
See application file for complete search history.

(56) References Cited

U.S. PATENT DOCUMENTS

| | | | | |
|---|---|---|---|---|
| 5,942,979 A * | 8/1999 | Luppino | .............. | B60K 28/066 180/272 |
| 6,952,161 B1 * | 10/2005 | Williams | ............. | A61B 5/6887 340/439 |
| 7,777,619 B2 * | 8/2010 | Yopp | .................... | B60K 28/066 180/272 |
| 8,874,301 B1 * | 10/2014 | Rao | ....................... | B60K 28/066 180/272 |
| 8,880,305 B2 * | 11/2014 | Inoue | .................. | B60W 10/184 477/126 |
| 8,942,880 B2 * | 1/2015 | Nordbruch | ............ | B60W 40/08 340/436 |
| 9,227,631 B2 * | 1/2016 | Kammel | ............... | B60K 28/066 |
| 2008/0252466 A1 * | 10/2008 | Yopp | .................... | B60K 28/066 340/576 |
| 2012/0123644 A1 * | 5/2012 | Waldmann | .............. | B60T 7/042 701/45 |
| 2014/0024494 A1 * | 1/2014 | Inoue | .................... | B60W 10/11 477/94 |
| 2015/0006012 A1 * | 1/2015 | Kammel | ............... | B60K 28/066 701/23 |
| 2015/0066284 A1 * | 3/2015 | Yopp | .................... | B60W 30/00 701/29.2 |
| 2017/0009691 A1 * | 1/2017 | Nakatsuka | ............... | B62D 6/04 |
| 2017/0120887 A1 * | 5/2017 | Kurahashi | ................ | B60Q 1/46 |
| 2017/0140232 A1 * | 5/2017 | Banno | ........................ | G06T 7/70 |
| 2017/0161575 A1 * | 6/2017 | Banno | .................... | B60K 28/06 |
| 2017/0267255 A1 * | 9/2017 | Numazawa | ........... | B60W 10/18 |

OTHER PUBLICATIONS

Office Action dated Sep. 4, 2018, issued in counterpart Chinese Application No. 201610836458. (6 pages).

* cited by examiner

STOP CONTROL DEVICE

CROSS REFERENCES TO RELATED APPLICATIONS

The present application claims priority under 35 U.S.C. § 119 to Japanese Patent Application No. 2015-207264, filed Oct. 21, 2015, entitled "Stop Control Device." The contents of this application are incorporated herein by reference in their entirety.

TECHNICAL FIELD

The present disclosure relates to a stop control device for automatically stopping a vehicle when an emergency occurs in which the driver of the vehicle is no longer able to drive the vehicle while the vehicle is traveling.

BACKGROUND

While a vehicle is traveling, an emergency might arise in which the driver of the vehicle is no longer able to drive the vehicle. For example, the health condition of the driver might suddenly deteriorate. To address such a critical situation, devices for automatically stopping vehicles upon the occurrence of emergencies have been developed. For example, U.S. Pat. No. 8,942,880 (claim 5) discloses that when an emergency occurs, automatic stop control of a vehicle is not performed until the detection of both a stop intention expressed by an occupant in the vehicle through an operation (such as a switch operation) other than a braking operation and a confirmation parameter indicating that the driver is in a state of being unable to drive the vehicle (hereinafter referred to as "unable-to-drive state").

In the technique disclosed in U.S. Pat. No. 8,942,880, if a confirmation parameter indicating that the unable-to-drive state of the driver has not been detected or estimated for some reason even though a stop intention made by operating a switch or by performing any other suitable operation has been detected, an occupant's unintended situation (rejection of a stop request) might occur. On the contrary, if automatic stop control is carried out immediately upon detection of either a stop intention or a confirmation parameter, a misoperation of the switch or a wrong judgment of the confirmation parameter might cause an occupant's unintended situation (execution of automatic stop control).

SUMMARY

The present application describes, for example, a stop control device configured to perform control to automatically stop a vehicle in accordance with the intention of an occupant in the vehicle.

An aspect of the present disclosure provides a stop control device for controlling stop of a vehicle, including a stop intention detector that detects or estimates a stop intention made through an operation other than a braking operation, an unable-to-drive state detector that detects or estimates an unable-to-drive state of a driver of the vehicle, the unable-to-drive state being a state of the driver who is not able to drive the vehicle, and an automatic stop controller that performs automatic stop control of the vehicle by using a brake system. The automatic stop controller performs the automatic stop control by using a first deceleration in response to detection or estimation of the stop intention by the stop intention detector or detection or estimation of the unable-to-drive state by the unable-to-drive state detector while the vehicle is traveling. Further, the automatic stop controller performs the automatic stop control by using a second deceleration larger than the first deceleration in response to detection or estimation of the stop intention by the stop intention detector and detection or estimation of the unable-to-drive state by the unable-to-drive state detector.

According to the aspect of the present disclosure, if a stop intention or an unable-to-drive state is detected or estimated while the vehicle is traveling, automatic stop control of the vehicle is performed by using a first deceleration (weaker deceleration) smaller than a second deceleration (stronger deceleration). For example, the driver becomes no longer able to drive the vehicle and an occupant, including the driver, expresses a stop intention by, for example, operating an emergency stop switch; however, such an unable-to-drive state of the driver may not be detected or estimated for some reason. Even in this case, automatic stop control is executed on the vehicle by using the first deceleration (weaker deceleration). This results in ensuring that the vehicle can be parked although more time is taken than when the automatic stop control is performed by using the second deceleration (stronger deceleration). In another example, either a stop intention or an unable-to-drive state of the driver may be detected or estimated due to a misoperation or a wrong judgment although the driver has no stop intention. In this case, the automatic stop control is executed merely by using the first deceleration (weaker deceleration). This eliminates the need for excessive acceleration to release the automatic stop control to result in transition back to the normal driving operation. According to the aspect of the present disclosure, therefore, automatic stop control of a vehicle can be performed in accordance with the intention of an occupant in the vehicle.

The stop control device may further include a driving operation detector that detects whether or not a driving operation component of the vehicle is operated, and the unable-to-drive state detector may estimate the unable-to-drive state of the driver in a case where the driving operation detector detects that the driving operation component is not operated for a predetermined time period or more. If the driver becomes no longer able to drive the vehicle, driving operation components, such as the accelerator pedal, the brake pedal, and the steering wheel, are no longer operated. By detecting whether the driving operation components are operated, it is possible to estimate whether or not the driver is in a state of being unable to drive the vehicle.

The stop control device may further include a vehicle velocity detector that detects a vehicle velocity of the vehicle. When the stop intention is detected or estimated by the stop intention detector or when the unable-to-drive state is detected or estimated by the unable-to-drive state detector, the automatic stop controller may increase the first deceleration in accordance with an increase in the vehicle velocity detected by the vehicle velocity detector. According to the aspect of the present disclosure, the first deceleration is set so that the higher the vehicle velocity, the larger the first deceleration. This can reduce the time taken to stop a vehicle that is traveling at a high speed when the vehicle is subjected to automatic stop control with the first deceleration. According to the aspect of the present disclosure, therefore, automatic stop control of the vehicle can be performed in accordance with the vehicle velocity.

The stop control device may further include a driving operation detector that detects whether or not a driving operation component of the vehicle is operated, and a vehicle velocity detector that detects a vehicle velocity of the vehicle. The automatic stop controller may perform the automatic stop control by using the second deceleration in a case where the driving operation detector detects that the driving operation component is in a non-operating state for a predetermined second time period or more within a first predetermined time period after the stop intention has been detected or estimated by the stop intention detector, and may release the automatic stop control in a case where the driving operation detector does not detect that the driving operation component is in a non-operating state for the predetermined second time period or more within the first predetermined time period after the stop intention has been detected or estimated by the stop intention detector. In addition, when the stop intention is detected or estimated by the stop intention detector, the automatic stop controller may increase the first predetermined time period in accordance with an increase in the vehicle velocity detected by the vehicle velocity detector. According to the aspect of the present disclosure, a time limit is set for automatic stop control in such a manner that the higher the vehicle velocity, the longer the first predetermined time period, that is, the longer the time limit for automatic stop control. This allows a vehicle that is traveling at a high speed to be parked by using automatic stop control. According to the aspect of the present disclosure, therefore, automatic stop control of the vehicle can be performed in accordance with the vehicle velocity.

The stop control device may further include an accelerator operation detector that detects whether or not an accelerator operation component of the vehicle is operated. The automatic stop controller may interrupt the automatic stop control in a case where the accelerator operation detector detects that the accelerator operation component is operated during the automatic stop control, and may release the automatic stop control in a case where the accelerator operation detector detects that the accelerator operation component is continuously operated for a predetermined time period or more. According to the aspect of the present disclosure, automatic stop control is interrupted by the occurrence of an accelerator operation and automatic stop control is released by the occurrence of an accelerator operation for a predetermined time period or more. This facilitates a transition back to the normal driving operation even if automatic stop control is executed erroneously.

BRIEF DESCRIPTION OF THE DRAWINGS

The advantages of the disclosure will become apparent in the following description taken in conjunction with the following drawings.

DETAILED DESCRIPTION

A stop control device 10 according to an exemplary embodiment of the present disclosure will be described in detail hereinafter with reference to the accompanying drawings.

1. Configuration of Stop Control Device 10

Figure 1:
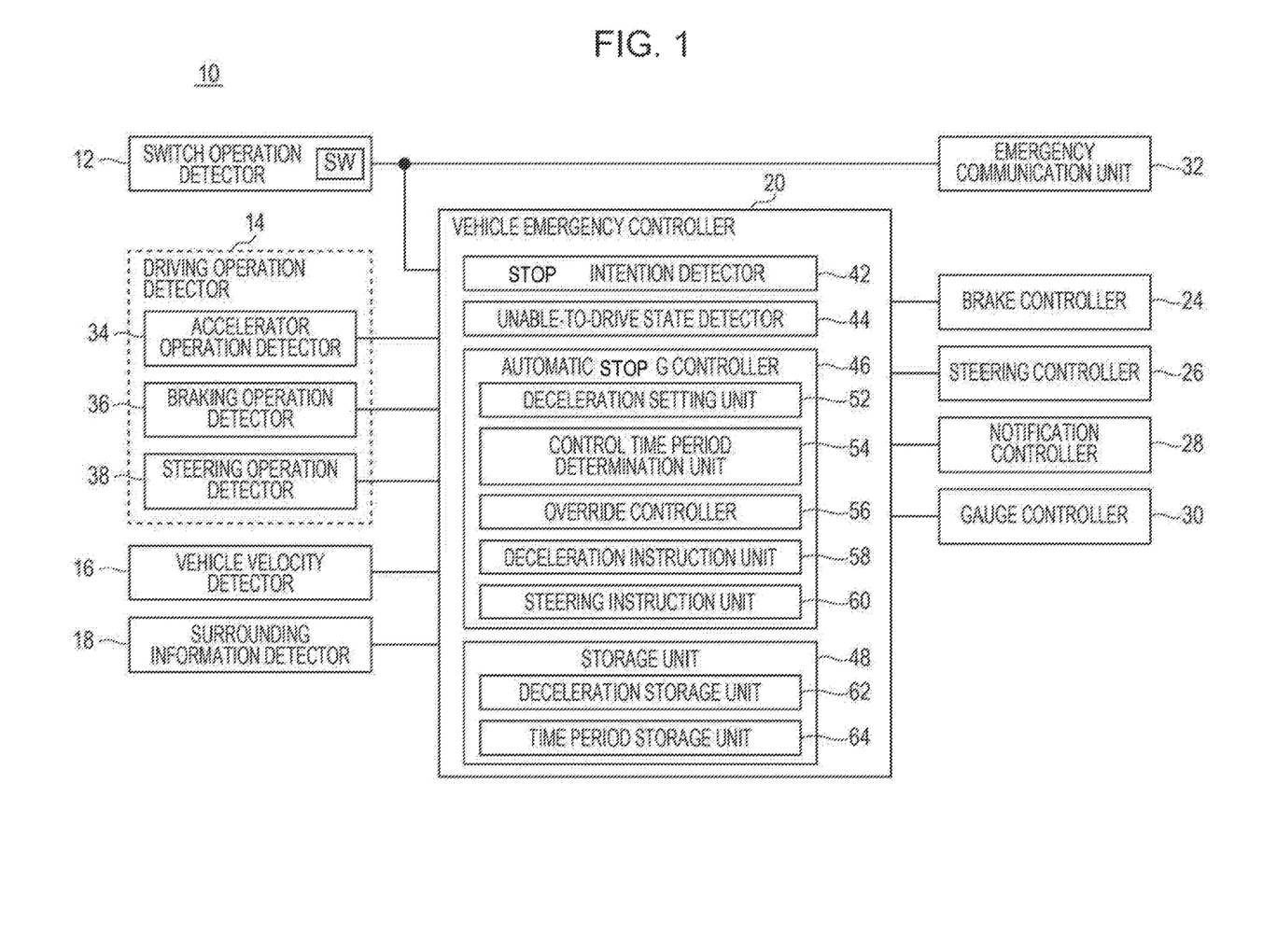
FIG. 1 is a functional block diagram of a stop control device according to embodiments.

The configuration of the stop control device 10 will be described with reference to FIG. 1. The stop control device 10 includes information detectors (namely, a switch operation detector 12, a driving operation detector 14, a vehicle velocity detector 16, and a surrounding information detector 18), a vehicle emergency controller 20 that performs processing for automatic stop control of a vehicle on the basis of information output from the information detectors, various controllers (namely, a brake controller 24, a steering controller 26, a notification controller 28, and a gauge controller 30) that control to-be-controlled devices in accordance with instructions output from the vehicle emergency controller 20, and an emergency communication unit 32 that provides an emergency notification.

1-1. Information detectors 12, 14, 16, and 18

The switch operation detector 12 detects whether or not an emergency stop switch SW disposed on the interior (for example, the roof) of the vehicle is being operated. The emergency stop switch SW is a switch operable by an occupant in the vehicle who intends to stop the vehicle when an emergency occurs. The occupant operates the emergency stop switch SW to express an intention to stop the vehicle (hereinafter referred to as "stop intention").

The driving operation detector 14 includes an accelerator operation detector 34, a braking operation detector 36, and a steering operation detector 38, which are configured to detect whether or not driving operation components (namely, an accelerator pedal, a brake pedal, and a steering wheel) is being operated.

The accelerator operation detector 34 detects the presence of an accelerator operation by the occupant. The accelerator operation detector 34 may be a device such as a stroke sensor that detects an operation amount of the accelerator pedal itself, or may be configured to detect an electrical signal generated in a drive-by-wire system.

The braking operation detector 36 detects the presence of a braking operation by the occupant. The braking operation detector 36 may be a device such as a stroke sensor that detects an operation amount of the brake pedal and/or a brake lever itself, or may be configured to detect an electrical signal generated in a brake-by-wire system.

The steering operation detector 38 detects the presence of a steering operation by the occupant. The steering operation detector 38 may be a device such as a torque sensor that detects a steering force applied to a steering shaft, or may be a device such as a touch sensor that detects the occupant's grasp of the steering wheel.

The vehicle velocity detector 16 detects the velocity V at which the vehicle is traveling (hereinafter referred to as "vehicle velocity V"). The vehicle velocity detector 16 computes the vehicle velocity V from the rotational speed of each wheel, for example.

The surrounding information detector 18 detects information on the situation ahead of the vehicle (e.g., lane markings, obstacles, vehicles, pedestrians, etc.). The surrounding information detector 18 may employ various cameras (such as a monocular camera, a stereo camera, and an infrared camera) and/or various radars (such as a millimeter-wave radar, a microwave radar, and a laser radar). A fusion sensor that integrates information obtained from the cameras with information obtained from the radars may also be used.

1-2. Vehicle Emergency Controller 20

The vehicle emergency controller 20 is constituted by an electronic control unit (ECU). The ECU is a calculation device including a microcomputer, and includes a central processing unit (CPU), a read-only memory (ROM) (also including an electrically erasable programmable ROM (EEPROM)), a random access memory (RAM), and other devices such as input/output devices, for example, an analog-to-digital (A/D) converter and a digital-to-analog (D/A) converter. The CPU reads and executes a program recorded on the ROM to allow the ECU to function as various function implementing units such as various controllers, a computation unit, and a processing unit. In this embodiment, an ECU constituting the vehicle emergency controller 20 executes a program to thereby function as a stop intention detector 42, an unable-to-drive state detector 44, and an automatic stop controller 46. The ROM includes a storage unit 48. The ECU may be divided into a plurality of sections or may be integrated with another ECU. The functions described above may be implemented by hardware.

The stop intention detector 42 is configured to detect or estimate a stop intention made through an operation other than a braking operation. It is assumed here that the stop intention detector 42 estimates that an occupant has expressed a stop intention when the switch operation detector 12 detects an ON signal of the emergency stop switch SW.

The unable-to-drive state detector 44 is configured to detect or estimate a state of the driver who is not able to drive the vehicle (hereinafter referred to as "unable-to-drive state"). It is assumed here that the unable-to-drive state detector 44 estimates an unable-to-drive state of the driver if none of the accelerator operation detector 34, the braking operation detector 36, and the steering operation detector 38 detects an operation signal for a predetermined time period or more.

The automatic stop controller 46 functions as a deceleration setting unit 52, a control time period determination unit 54, an override controller 56, a deceleration instruction unit 58, and a steering instruction unit 60. The deceleration setting unit 52 is configured to set a deceleration for automatic stop control in accordance with the detection or estimation results obtained by the stop intention detector 42 and the unable-to-drive state detector 44. The control time period determination unit 54 is configured to set a time limit Tb1th for automatic stop control when the stop intention detector 42 detects or estimates a stop intention and when the unable-to-drive state detector 44 detects or estimates no unable-to-drive state. The override controller 56 is configured to execute automatic stop control relating to accelerator override. The deceleration instruction unit 58 is configured to notify the brake controller 24 of the deceleration set or required by the deceleration setting unit 52, the control time period determination unit 54, and the override controller 56. The steering instruction unit 60 is configured to set an amount of steering so as to prevent the vehicle from exiting the lane during the automatic stop control on the basis of information obtained from the surrounding information detector 18 and to execute automatic steering control with the set amount of steering.

Figure 2:
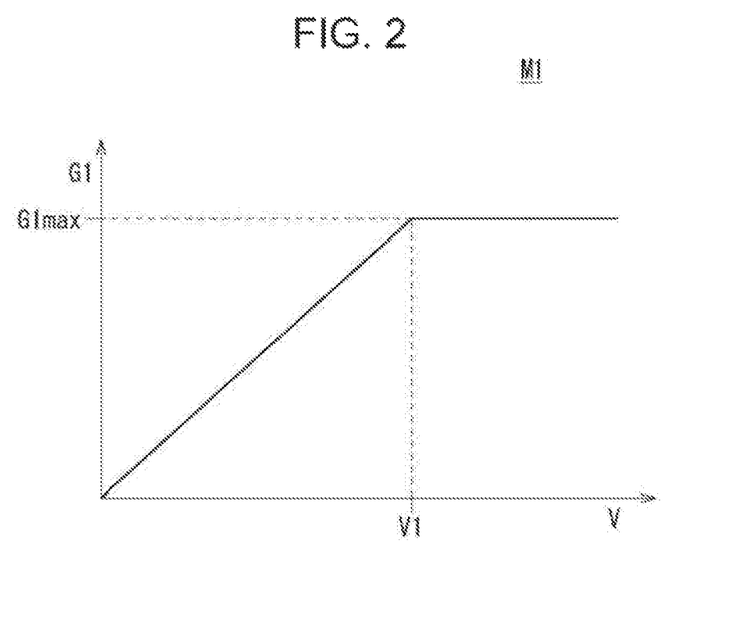
FIG. 2 illustrates a relationship between the vehicle velocity and a first deceleration.
Figure 3:
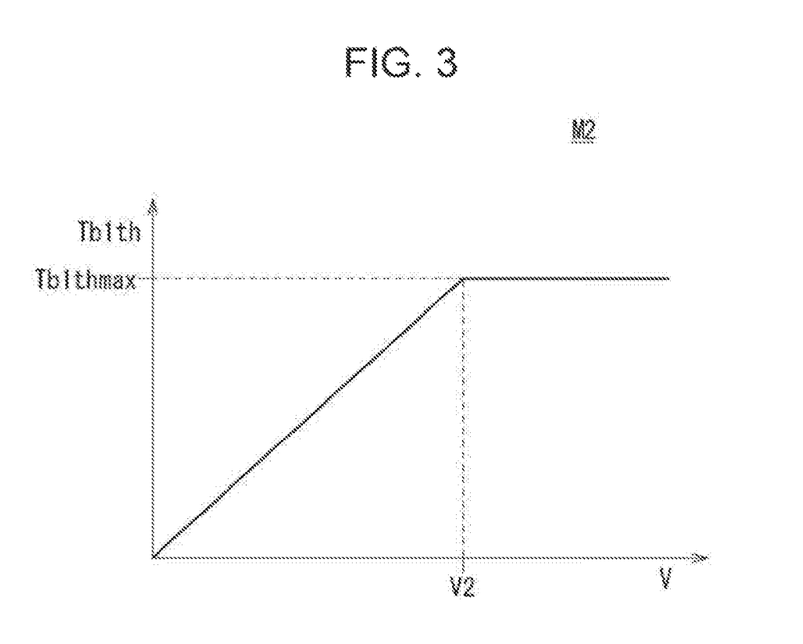
FIG. 3 illustrates a relationship between the vehicle velocity and a first predetermined time period.

The storage unit 48 includes a deceleration storage unit 62 and a time period storage unit 64. The deceleration storage unit 62 stores a first deceleration G1 and a second deceleration G2 of which the brake controller 24 is to be notified to execute the automatic stop control. The first deceleration G1 may be a specific value or may be stored in the form of a map M1 of the vehicle velocity V versus the first deceleration G1, as illustrated in FIG. 2. The map M1 illustrated in FIG. 2 depicts that as the vehicle velocity V increases, the first deceleration G1 increases accordingly. In addition, a first deceleration G1max corresponding to a predetermined vehicle velocity V1 or higher is kept constant. The second deceleration G2 has a value sufficiently larger than the first deceleration G1. Note that the magnitude of the first deceleration G1 and the magnitude of the second deceleration G2 need to be sufficient to generate a brake force for allowing the vehicle to stop. For example, a torque-converter-equipped vehicle with an automatic transmission (AT) may not stop due to creep if the deceleration is small. In this embodiment, the first deceleration G1 and the second deceleration G2 are set so that the magnitudes thereof are sufficient to generate a brake force for allowing the vehicle to stop against the creep. The time period storage unit 64 stores various predetermined time periods used in various determination processes executed during the automatic stop control. Among the stored predetermined time periods, a first predetermined time period (the time limit Tb1th) which is used in a control time period determination process (see FIG. 7) may be a specific time period or may be stored in the form of a map M2 of the vehicle velocity V versus the first predetermined time period (the time limit Tb1th), as illustrated in FIG. 3. The map M2 illustrated in FIG. 3 depicts that as the vehicle velocity V increases, the first predetermined time period (the time limit Tb1th) increases accordingly. In addition, a first predetermined time period (a time limit Tb1thmax) corresponding to a predetermined vehicle velocity V2 or higher is kept constant.

1-3. Other Controllers 24, 26, 28, and 30

The brake controller 24 includes brake devices such as a friction brake and an motor-driven parking brake, and a brake ECU that controls the brake devices. The brake ECU executes a program to thereby function as various function implementing units. The brake ECU performs automatic stop control to stably stop the vehicle in accordance with the vehicle velocity V detected by the vehicle velocity detector 16 and other parameters such as a steering angle, a yaw rate, and an acceleration/deceleration which are respectively detected by a steering-angle sensor, a yaw-rate sensor, and an acceleration sensor (which are not illustrated). The brake ECU determines an optimum brake pressure for each wheel in accordance with a deceleration instruction (the first deceleration G1 or the second deceleration G2) output from the automatic stop controller 46. Then, the brake ECU controls a brake actuator for the friction brake device. When the vehicle is parked, the brake ECU activates the motor-driven parking brake.

The steering controller 26 includes a motor-driven power steering device and a steering ECU that controls the motor-driven power steering device. The steering ECU executes a program to thereby function as various function implementing units. The steering ECU performs lane-keeping control and road-departure prevention control on the basis of the steering angle detected by the steering-angle sensor (not illustrated) and lane-marking information acquired by the surrounding information detector 18. Specifically, the steering ECU computes an appropriate amount of steering so as to keep the distance between the vehicle and the lane marking within a predetermined range on the basis of the lane-marking information acquired by the surrounding information detector 18. Then, the steering ECU controls a steering actuator for the motor-driven power steering device. If the distance between the vehicle and the lane marking becomes small, the steering ECU controls the steering actuator to perform a warning operation via the steering wheel (by vibrating the steering wheel, for example).

The notification controller 28 includes a notification device such as a speaker or a display, and a notification ECU that controls the notification device. The notification ECU executes a program to thereby function as various function implementing units. When automatic stop control is executed, the notification ECU controls the speaker and/or the display to provide notification that automatic stop control is being executed.

The gauge controller 30 includes an automotive illumination system including a meter panel, hazard lights, and so on, and a gauge ECU. The gauge ECU executes a program to thereby function as various function implementing units. When automatic stop control is executed, the gauge ECU provides a state indication indicating that automatic stop control is in progress by using the meter panel and further flashes the hazard lights.

1-4. Emergency Communication Unit 32

The emergency communication unit 32 includes a communication terminal located within the vehicle, and a connection device that connects the communication terminal to a communication terminal in an external organization, namely, an emergency care center in this embodiment, via a dedicated line or a public line. In response to the detection of an operation of the emergency stop switch SW by using the switch operation detector 12, the emergency communication unit 32 sets up a communication line between the communication terminal located within the vehicle and the communication terminal in the emergency care center.

2. Processes Performed in This Embodiment 2-1. Basic Process

Figure 4:
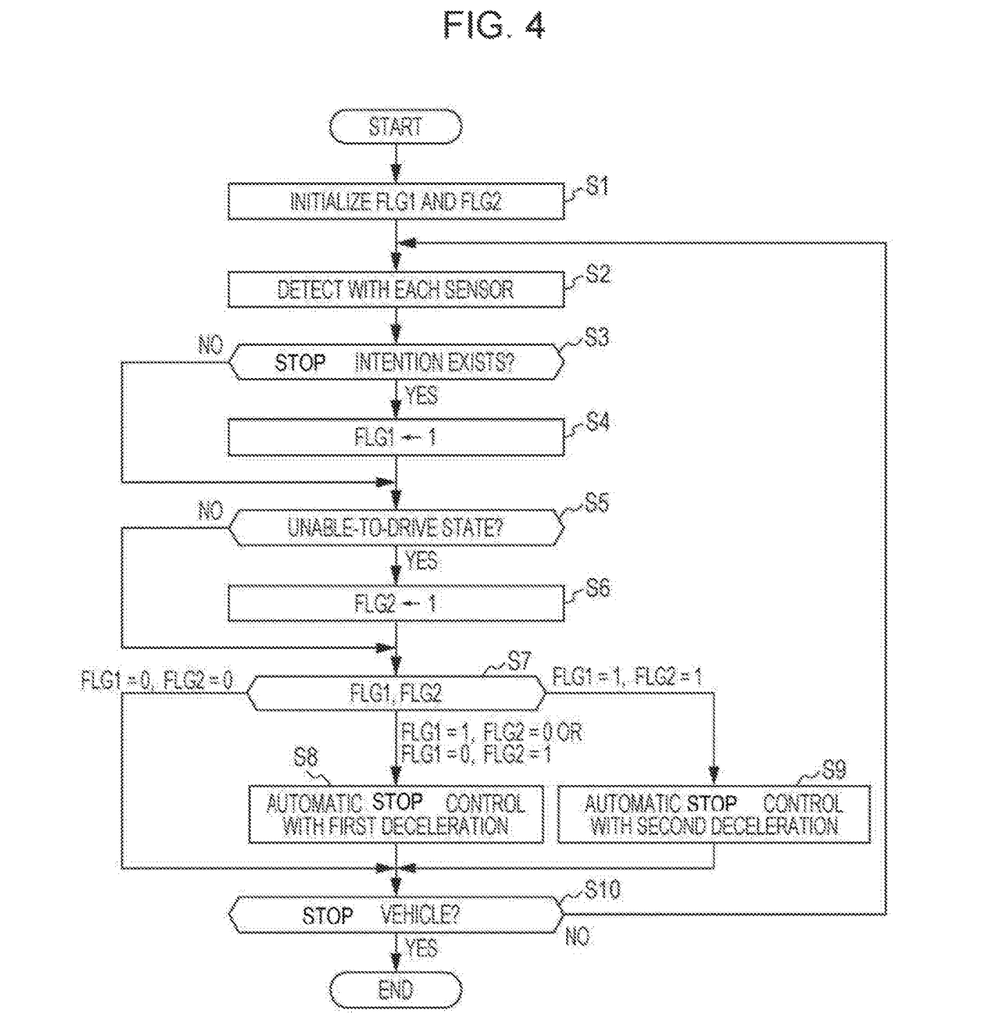
FIG. 4 is a flowchart of a basic process executed by a stop control device according to an embodiment.

A basic process performed by the stop control device 10 will be described with reference to FIG. 4. A process illustrated in FIG. 4 is started when the ignition of the vehicle is turned on or at a predetermined timing.

In step S1, the stop intention detector 42 initializes a stop intention determination flag (hereinafter referred to as "FLG1") indicating whether or not an occupant has a stop intention. Further, the unable-to-drive state detector 44 initializes an unable-to-drive state determination flag (hereinafter referred to as "FLG2") indicating whether or not the driver is in an unable-to-drive state.

In step S2, each information detector (the switch operation detector 12, the driving operation detector 14, the vehicle velocity detector 16, and the surrounding information detector 18) detects corresponding information. The detection of the corresponding information is performed constantly or at regular intervals (in units of milliseconds) while the vehicle is traveling.

Upon the occurrence of an emergency, an occupant operates the emergency stop switch SW to express a stop intention. At this time, the switch operation detector 12 detects the switch operation of the emergency stop switch SW. In this embodiment, when the switch operation detector 12 detects a switch operation of the emergency stop switch SW, the stop intention detector 42 determines that a stop intention exists. If a stop intention exists in step S3 (YES in step S3), the process proceeds to step S4. In step S4, the stop intention detector 42 sets the flag FLG1 to 1 and then the process proceeds to step S5. On the other hand, if no stop intention exists in step S3 (NO in step S3), the process proceeds directly to step S5.

When the driver falls into an unable-to-drive state, the driving operation components such as the accelerator pedal, the brake pedal, and the steering wheel are no longer operated. In this embodiment, if none of the accelerator operation detector 34, the braking operation detector 36, and the steering operation detector 38 detects an operation signal for a predetermined time period (a predetermined non-operation period Tath) before that point in time, the unable-to-drive state detector 44 determines that the driver is in an unable-to-drive state. If it is determined in step S5 that the driver is in an unable-to-drive state (YES in step S5), the process proceeds to step S6. In step S6, the unable-to-drive state detector 44 sets the flag FLG2 to 1 and then the process proceeds to step S7. On the other hand, if it is determined in step S5 that the driver is not in an unable-to-drive state (NO in step S5), the process proceeds directly to step S7.

In the foregoing description, the processing of step S3 and step S4 is followed by the processing of step S5 and step S6. In actuality, however, the processing of step S3 and step S4 and the processing of step S5 and step S6 are performed in parallel.

If the flags FLG1 and FLG2 are both 0 in step S7 (FLG1=0 and FLG2=0 in step S7), that is, if the occupant has no stop intention and the driver is not in an unable-to-drive state, no automatic stop control is performed. If any one of the flags FLG1 and FLG2 is 1 in step S7 (FLG1=1 and FLG2=0 or FLG1=0 and FLG2=1 in step S7), that is, if the occupant has a stop intention or the driver is in an unable-to-drive state, the process proceeds to step S8. In step S8, the deceleration setting unit 52 sets the first deceleration G1, and the deceleration instruction unit 58 outputs a deceleration instruction with the first deceleration G1 to the brake controller 24. The brake controller 24 controls the brake actuator in accordance with the deceleration instruction to perform automatic stop control with the first deceleration G1. If the flags FLG1 and FLG2 are both 1 in step S7 (FLG1=1 and FLG2=1 in step S7), that is, if the occupant has a stop intention and the driver is in an unable-to-drive state, the process proceeds to step S9. In step S9, the deceleration setting unit 52 sets the second deceleration G2, and the deceleration instruction unit 58 outputs a deceleration instruction with the second deceleration G2 to the brake controller 24. The brake controller 24 controls the brake actuator in accordance with the deceleration instruction to perform automatic stop control with the second deceleration G2.

If the vehicle velocity V detected by the vehicle velocity detector 16 is 0 in step S10 (YES in step S10), the automatic stop controller 46 outputs a vehicle stationary instruction to the brake controller 24. The brake controller 24 controls the motor-driven parking brake in accordance with the vehicle stationary instruction to hold the vehicle stationary. On the other hand, if the vehicle velocity V detected by the vehicle velocity detector 16 is not 0 in step S10 (NO in step S10), the process subsequent to step S2 is repeatedly performed.

Next, a specific example of some processes in the basic process illustrated in FIG. 4 described above and processes executable at the same time as these processes will be described with reference to FIG. 5 to FIG. 8.

2-2. Non-operation Determination Process

Figure 5:
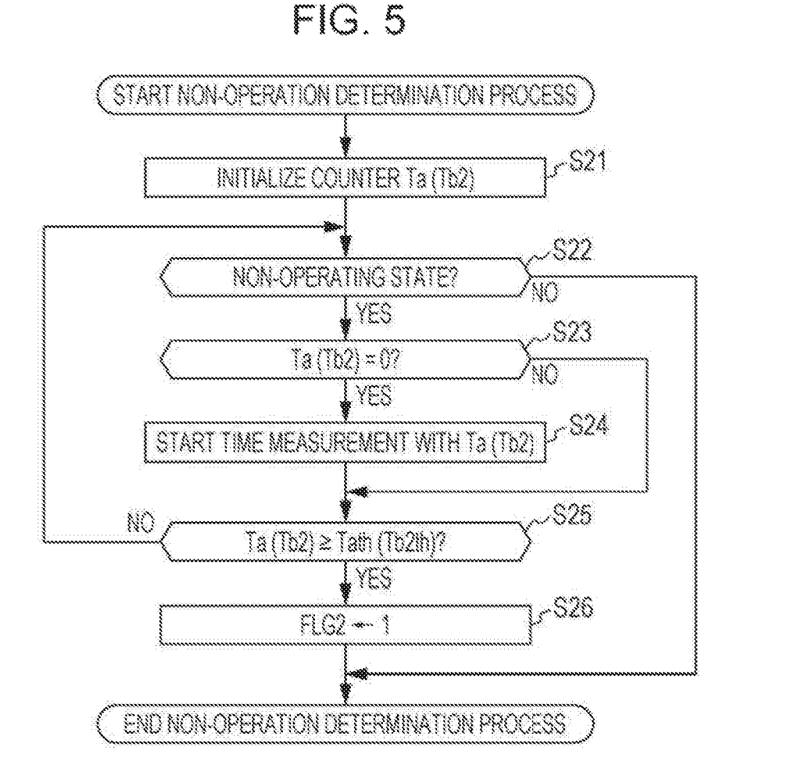
FIG. 5 is a flowchart of a non-operation determination process.

A non-operation determination process illustrated in FIG. 5 is an example of the process for determining whether or not the driver is in an unable-to-drive state (step S5 and step S6 illustrated in FIG. 4). The unable-to-drive state detector 44 is an entity that performs this process. The process illustrated in FIG. 5 may be executed constantly or at regular intervals (in units of milliseconds).

In step S21, the unable-to-drive state detector 44 initializes a counter Ta for measuring the period of time (hereinafter referred to as "non-operation time period") during which the driving operation components such as the accelerator pedal, the brake pedal, and the steering wheel are not operated.

If each of the driving operation components is in a non-operating state in step S22 (YES in step S22), that is, if none of the accelerator operation detector 34, the braking operation detector 36, and the steering operation detector 38 detects an operation signal, the process proceeds to step S23. On the other hand, if any of the driving operation components is in an operating state in step S22 (NO in step S22), that is, if at least one of the accelerator operation detector 34, the braking operation detector 36, and the steering operation detector 38 detects an operation signal, the non-operation determination process ends.

If the counter Ta is 0 in step S23 (YES in step S23), that is, if the counter Ta has not measured the non-operation time period, the process proceeds to step S24. In step S24, the unable-to-drive state detector 44 starts time measurement by using the counter Ta and then the process proceeds to step S25. On the other hand, if the counter Ta is not 0 in step S23 (NO in step S23), that is, if the counter Ta has started time measurement, the process proceeds directly to step S25.

If the counter Ta is greater than or equal to the predetermined non-operation period Tath in step S25 (YES in step S25), that is, if each driving operation component is not operated for a period of time greater than or equal to the predetermined non-operation period Tath, the process proceeds to step S26. In step S26, the unable-to-drive state detector 44 sets the flag FLG2 to 1. On the other hand, if the counter Ta is less than the predetermined non-operation period Tath in step S25 (NO in step S25), the process subsequent to step S22 is repeatedly performed.

2-3. First Deceleration Setting Process

Figure 6:
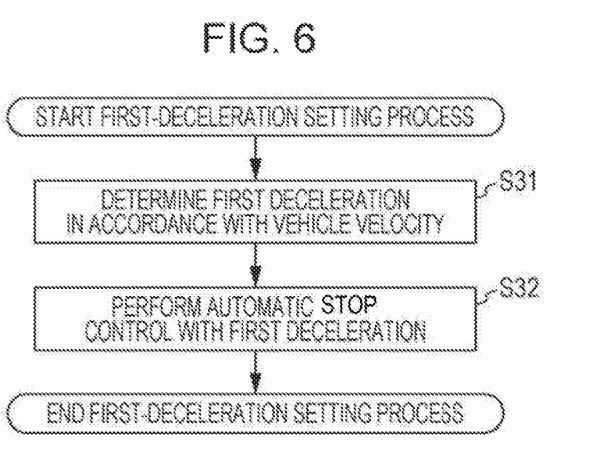
FIG. 6 is a flowchart of a process for setting the first deceleration.

A first deceleration setting process illustrated in FIG. 6 is an example of an automatic stop control process using the first deceleration G1 (step S8 in FIG. 4). The automatic stop controller 46 (mainly, the deceleration setting unit 52 and the deceleration instruction unit 58) is an entity that performs this process.

In step S31, the deceleration setting unit 52 determines a first deceleration G1 in accordance with the vehicle velocity V. The deceleration setting unit 52 acquires the vehicle velocity V detected by the vehicle velocity detector 16 when a stop intention is detected by the stop intention detector 42. Further, the deceleration setting unit 52 determines a first deceleration G1 in accordance with the vehicle velocity V on the basis of the map M1 (see FIG. 2) of the vehicle velocity V versus the first deceleration G1, which is stored in the deceleration storage unit 62.

In step S32, the deceleration setting unit 52 sets the first deceleration G1, and the deceleration instruction unit 58 outputs a deceleration instruction with the first deceleration G1 to the brake controller 24. The brake controller 24 controls the brake actuator in accordance with the deceleration instruction to perform automatic stop control with the first deceleration G1.

Instead of the automatic stop control with the first deceleration G1 corresponding to the vehicle velocity V as in the processing of step S31 and step S32, automatic stop control with a first deceleration G1 specified regardless of the vehicle velocity V may be executed.

2-4. Control Time Period Determination Process

Figure 7:
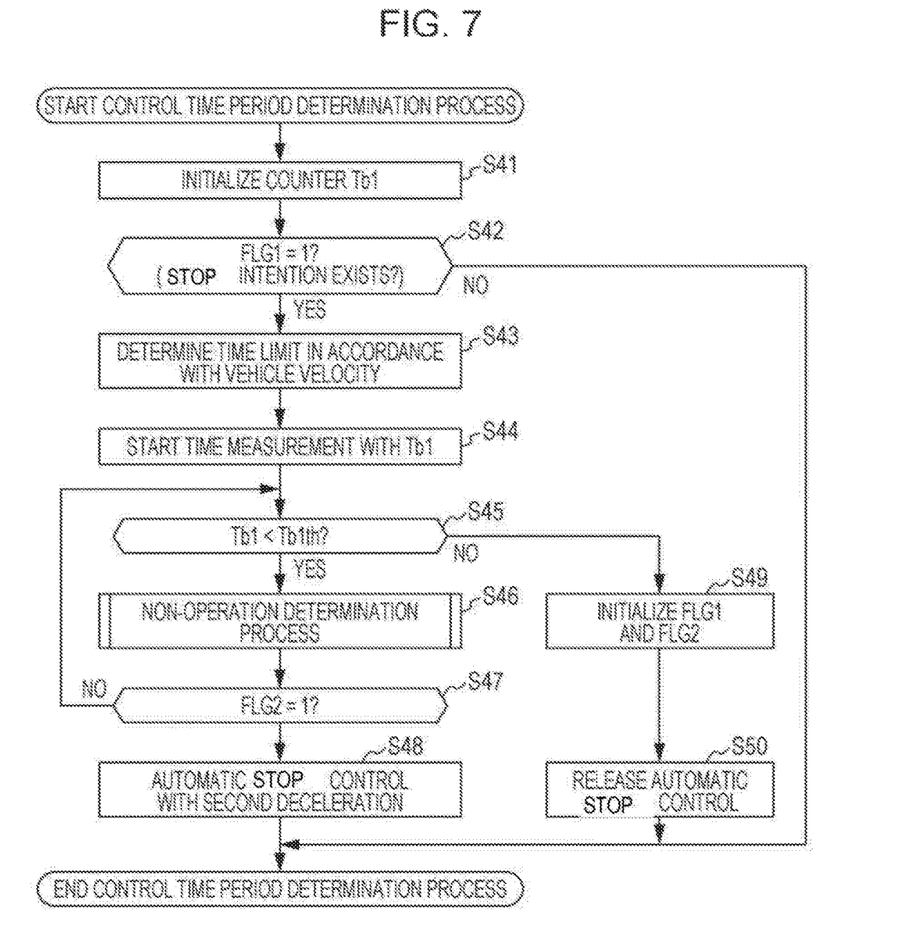
FIG. 7 is a flowchart of a control time period determination process.

A control time period determination process illustrated in FIG. 7 is a process executable at the same time as the automatic stop control with the first deceleration G1 (step S8 in FIG. 4). The stop intention detector 42, the unable-to-drive state detector 44, and the automatic stop controller 46 (mainly, the control time period determination unit 54) are entities that perform this process. The process illustrated in FIG. 7 may be executed constantly or at regular intervals (in units of milliseconds).

The illustrated process is executed automatic stop control with the first deceleration G1 is performed in response to the detection or estimation of a stop intention by the stop intention detector 42. In the illustrated process, automatic stop control with the second deceleration G2 is performed if the driving operation components are in a non-operating state for a period of time greater than or equal to a predetermined non-operation period (a second predetermined time period) Tb2th within a time limit (a first predetermined time period) Tb1th after the stop intention has been detected or estimated. In the illustrated process, furthermore, the automatic stop control is released if the driving operation components are not in a non-operating state for a period of time greater than or equal to the predetermined non-operation period (second predetermined time period) Tb2th within the time limit (first predetermined time period) Tb1th after the stop intention has been detected or estimated. In addition, the time limit (first predetermined time period) Tb1th is determined in accordance with the vehicle velocity V obtained when a stop intention is detected, and is set to be longer as the vehicle velocity V increases. The process flow is described hereinbelow.

In step S41, the control time period determination unit 54 initializes a counter Tb1 for measuring the period of time (hereinafter referred to as "execution time period") during which automatic stop control with the first deceleration G1 is executed.

If the flag FLG1 is 1 in step S42 (YES in step S42), that is, if the occupant has a stop intention, the process proceeds to step S43. On the other hand, if the flag FLG1 is 0 in step S42 (NO in step S42), that is, if the occupant has no stop intention, the control time period determination process ends.

In step S43, the control time period determination unit 54 determines a time limit Tb1th in accordance with the vehicle velocity V. The control time period determination unit 54 acquires the vehicle velocity V detected by the vehicle velocity detector 16 when a stop intention is detected by the stop intention detector 42. Further, the control time period determination unit 54 determines a time limit Tb1th in accordance with the vehicle velocity V on the basis of the map M2 (see FIG. 3) of the vehicle velocity V versus the time limit Tb1th, which is stored in the time period storage unit 64. The map M2 of the vehicle velocity V versus the time limit Tb1th is set so that the higher the vehicle velocity V, the longer the time limit Tb1th.

In step S44, the control time period determination unit 54 starts time measurement by using the counter Tb1.

If the counter Tb1 is less than the time limit Tb1th in step S45 (YES in step S45), that is, if the execution time period of the automatic stop control is less than the time limit Tb1th, the process proceeds to step S46. In step S46, the control time period determination unit 54 performs a non-operation determination process for determining whether or not the driving operation components are in a non-operating state for a period of time greater than or equal to the predetermined non-operation period Tb2th. Here, the non-operation determination process illustrated in FIG. 5 is performed. In the non-operation determination process illustrated in FIG. 5, a counter Tb2 and the predetermined non-operation period Tb2th are respectively used instead of the counter Ta and the predetermined non-operation period Tath.

If the flag FLG2 is 1 in step S47 (YES in step S47), that is, if it is determined in the non-operation determination process of step S46 that the driving operation components are in a non-operating state for a period of time greater than or equal to the predetermined non-operation period Tb2th, the process proceeds to step S48. In step S48, the deceleration setting unit 52 sets a second deceleration G2, and the deceleration instruction unit 58 outputs a deceleration instruction with the second deceleration G2 to the brake controller 24. The brake controller 24 controls the brake actuator in accordance with the deceleration instruction to perform automatic stop control with the second deceleration G2. On the other hand, if the flag FLG2 is 0 in step S47 (NO in step S47), the process subsequent to step S45 is repeatedly performed.

If the counter Tb1 is greater than or equal to the time limit Tb1th in step S45 (NO in step S45), that is, if the execution time period of the automatic stop control is greater than or equal to the time limit Tb1th, the process proceeds to step S49. In step S49, the stop intention detector 42 and the unable-to-drive state detector 44 initialize the flags FLG1 and FLG2. In step S50, the deceleration instruction unit 58 stops the output of a deceleration instruction to the brake controller 24. The brake controller 24 releases the automatic stop control.

2-5. Override Process

Figure 8:
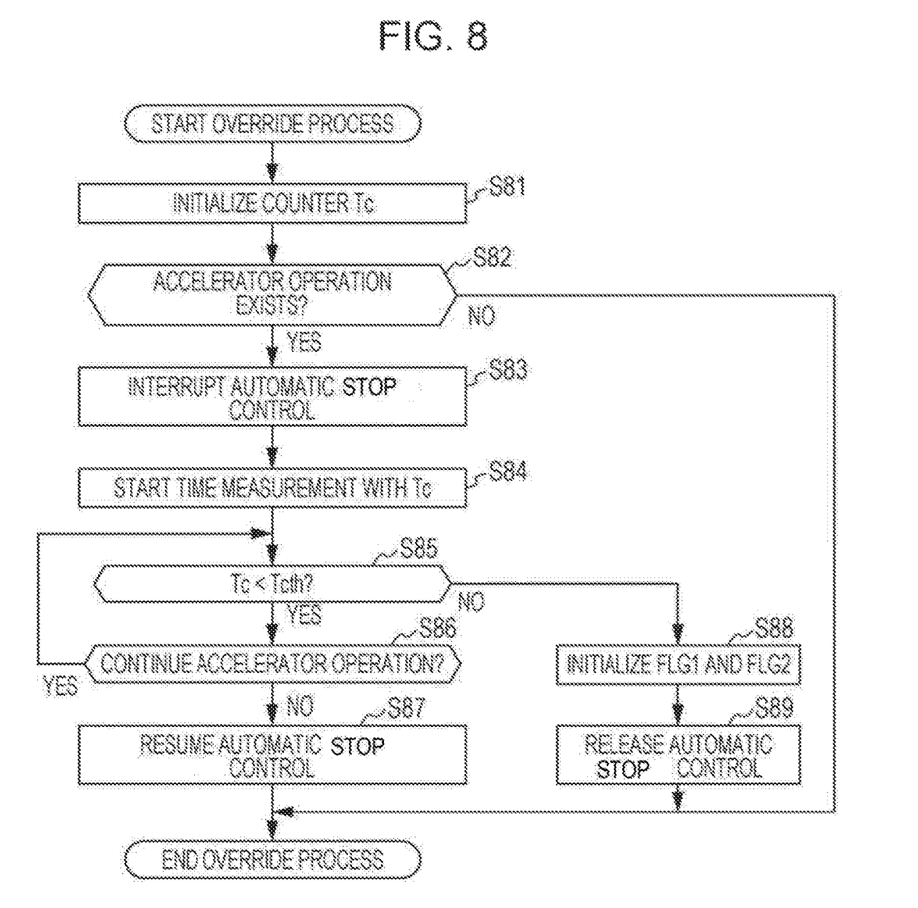
FIG. 8 is a flowchart of an override process.

An override process illustrated in FIG. 8 is a process executable at the same time as the automatic stop control (step S8 and step S9 in FIG. 4). The automatic stop controller 46 (mainly, the override controller 56) is an entity that performs this process. The process illustrated in FIG. 8 may be executed constantly or at regular intervals (in units of milliseconds).

In the illustrated process, the automatic stop control is interrupted when the accelerator pedal is operated during the automatic stop control, and, in addition, the automatic stop control is released when the accelerator pedal is continuously operated for a period of time greater than or equal to a predetermined time period (an override predetermined time period Tcth). The process flow is described hereinbelow.

In step S81, the override controller 56 initializes a counter Tc for measuring the period of time (hereinafter referred to as "operating time period") during which the accelerator pedal is operated.

If an accelerator operation exists in step S82 (YES in step S82), that is, if the accelerator operation detector 34 detects an operation signal, the process proceeds to step S83. On the other hand, if no accelerator operation exists (NO in step S82), that is, if the accelerator operation detector 34 detects no operation signal, the override process ends.

In step S83, the override controller 56 interrupts the automatic stop control that is being executed at that point in time. At this time, the deceleration instruction unit 58 interrupts the output of a deceleration instruction with the first deceleration G1 or the second deceleration G2 to the brake controller 24. Then, the brake controller 24 interrupts the control of the brake actuator.

In step S84, the override controller 56 starts time measurement by using the counter Tc.

If the counter Tc is less than the override predetermined time period Tcth in step S85 (YES in step S85), that is, if the operating time period of the accelerator pedal is less than the override predetermined time period Tcth, the process proceeds to step S86.

If the operation of the accelerator pedal is continuing in step S86 (YES in step S86), the process subsequent to step S85 is repeatedly performed. On the other hand, if the operation of the accelerator pedal has been completed in step S86 (NO in step S86), the process proceeds to step S87. In step S87, the override controller 56 resumes the automatic stop control. At this time, the deceleration instruction unit 58 resumes the output of a deceleration instruction with the first deceleration G1 or the second deceleration G2 to the brake controller 24. Then, the brake controller 24 resumes the control of the brake actuator.

If the counter Tc is greater than or equal to the override predetermined time period Tcth in step S85 (NO in step S85), that is, if the operating time period of the accelerator pedal is greater than or equal to the override predetermined time period Tcth, the process proceeds to step S88.

In step S88, the stop intention detector 42 and the unable-to-drive state detector 44 initialize the flags FLG1 and FLG2. In step S89, the deceleration instruction unit 58 stops the output of a deceleration instruction with the first deceleration G1 or the second deceleration G2 to the brake controller 24. The brake controller 24 releases the automatic stop control.

3. Summary of This Embodiment

The stop control device 10 includes the stop intention detector 42, which detects or estimates a stop intention made through an operation other than a braking operation, the unable-to-drive state detector 44, which detects or estimates an unable-to-drive state of the driver, the unable-to-drive state being a state of the driver who is not able to drive the vehicle, and the automatic stop controller 46, which performs automatic stop control of the vehicle by using a brake system. As illustrated in FIG. 4, the automatic stop controller 46 (the deceleration setting unit 52 and the deceleration instruction unit 58) performs automatic stop control by using the first deceleration G1 in response to the detection or estimation of a stop intention by the stop intention detector 42 or the detection or estimation of the unable-to-drive state by the unable-to-drive state detector 44 while the vehicle is traveling. Further, the automatic stop controller 46 performs automatic stop control by using the second deceleration G2 larger than the first deceleration G1 in response to the detection or estimation of a stop intention by the stop intention detector 42 and the detection or estimation of the unable-to-drive state by the unable-to-drive state detector 44.

In the stop control device 10, if a stop intention or an unable-to-drive state is detected or estimated while the vehicle is traveling, automatic stop control of the vehicle is performed by using the first deceleration G1 (weaker deceleration), which is smaller than the second deceleration G2 (stronger deceleration). For example, the driver becomes no longer able to drive the vehicle and an occupant, including the driver, expresses a stop intention by, for example, operating the emergency stop switch SW; however, such an unable-to-drive state of the driver may not be detected or estimated for some reason. Even in this case, automatic stop control is executed on the vehicle by using the first deceleration G1 (weaker deceleration). This results in ensuring that the vehicle can be parked although more time is taken than when the automatic stop control is performed by using the second deceleration G2 (stronger deceleration). In another example, either a stop intention or an unable-to-drive state of the driver may be detected or estimated due to a misoperation or a wrong judgment although the driver has no stop intention. In this case, the automatic stop control is executed merely by using the first deceleration G1 (weaker deceleration). This eliminates the need for excessive acceleration to release the automatic stop control to result in a transition back to the normal driving operation. According to this embodiment, therefore, automatic stop control of a vehicle can be performed in accordance with the intention of an occupant in the vehicle.

The stop control device 10 further includes the driving operation detector 14, which detects whether or not a driving operation component of the vehicle is operated. The unable-to-drive state detector 44 estimates the unable-to-drive state of the driver in a case where the driving operation detector 14 detects that the driving operation component is not operated for a predetermined time period or more. If the driver becomes no longer able to drive the vehicle, driving operation components, such as the accelerator pedal, the brake pedal, and the steering wheel, are no longer operated. By detecting whether the driving operation components are operated, it is possible to estimate whether or not the driver is in a state of being unable to drive the vehicle.

The stop control device 10 includes the vehicle velocity detector 16, which detects a vehicle velocity of the vehicle. When a stop intention is detected or estimated by the stop intention detector 42 or when the unable-to-drive state is detected or estimated by the unable-to-drive state detector 44, the automatic stop controller 46 increases the first deceleration G1 in accordance with an increase in the vehicle velocity V detected by the vehicle velocity detector 16 (see FIG. 2). In the stop control device 10, the first deceleration G1 is set so that the higher the vehicle velocity V, the larger the first deceleration G1. This can reduce the time taken to stop a vehicle that is traveling at a high speed when the vehicle is subjected to automatic stop control with the first deceleration G1. Therefore, automatic stop control of the vehicle can be performed in accordance with the vehicle velocity V.

The automatic stop controller 46 performs automatic stop control by using the second deceleration G2 in a case where the driving operation detector 14 detects that the driving operation components are in a non-operating state for a period of time greater than or equal to the predetermined non-operation period (second predetermined time period) Tb1th within the time limit (first predetermined time period) Tb1th after a stop intention has been detected or estimated by the stop intention detector 42.

Further, the automatic stop controller 46 releases the automatic stop control in a case where the driving operation detector 14 does not detect that the driving operation components are in a non-operating state for a period of time greater than or equal to the predetermined non-operation period (second predetermined time period) Tb2th within the time limit (first predetermined time period) Tb1th after a stop intention has been detected or estimated by the stop intention detector 42. In addition, when a stop intention is detected or estimated by the stop intention detector 42, the automatic stop controller 46 increases the time limit (first predetermined time period) Tb1th in accordance with an increase in the vehicle velocity V detected by the vehicle velocity detector 16 (see FIG. 3). In the stop control device 10, the time limit Tb1th is set for automatic stop control in such a manner that the higher the vehicle velocity V, the longer the time limit Tb1th. This allows a vehicle that is traveling at a high speed to be parked by using automatic stop control. Therefore, automatic stop control of the vehicle can be performed in accordance with the vehicle velocity.

The stop control device 10 includes the accelerator operation detector 34, which detects whether or not the accelerator pedal of the vehicle is operated. The automatic stop controller 46 interrupts the automatic stop control in a case where the accelerator operation detector 34 detects that the accelerator pedal is operated during the automatic stop control. Further, the automatic stop controller 46 releases the automatic stop control in a case where the accelerator operation detector 34 detects that the accelerator pedal is continuously operated for a period of time greater than or equal to the override predetermined time period Tcth. In the stop control device 10, automatic stop control is interrupted by the operation of the accelerator pedal and automatic stop control is released by the occurrence of an accelerator operation for a period of time greater than or equal to the override predetermined time period Tcth. This facilitates a transition back to the normal driving operation even if automatic stop control is executed erroneously.

4. Other Embodiments

In the embodiment described above, a stop intention of an occupant is detected based on an operation of the emergency stop switch SW, which is operated by the occupant. However, an alternative method may be employed. For example, an image of the face of the driver may be captured and the determination of a stop intention may be based on whether or not the driver's eyelids are closed. The determination may also be based on whether or not the posture of the driver is getting worse. Alternatively, the determination may be based on the voice (volume or tone) of an occupant in the vehicle.

The emergency stop switch SW is a device with which an occupant instructs the vehicle emergency controller 20 to execute or cancel the execution of automatic stop control, and is also a device with which an occupant gives instructions to start communication with an emergency care center. That is, the emergency stop switch SW is assigned a function for starting a call to an entity outside the vehicle as well as a function for indicating an intention of an occupant for executing and canceling the execution of automatic stop control of the traveling vehicle. The emergency stop switch SW may not necessarily be assigned a function for starting a call to an entity outside the vehicle but may be assigned any other function. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

We claim:

1. A stop control device for controlling stop of a vehicle, comprising:
   a stop intention detector that detects or estimates a stop intention made through an operation other than a braking operation;
   an unable-to-drive state detector that detects or estimates an unable-to-drive state of a driver of the vehicle, the unable-to-drive state being a state of the driver who is not able to drive the vehicle; and
   an automatic stop controller that performs automatic stop control of the vehicle by using a brake system,
   wherein the automatic stop controller:
   performs the automatic stop control by decelerating the vehicle by using a first deceleration in response to (i) detection or estimation of the stop intention by the stop intention detector or (ii) detection or estimation of the unable-to-drive state by the unable-to-drive state detector while the vehicle is traveling, and
   performs the automatic stop control by decelerating the vehicle by using a second deceleration larger than the first deceleration in response to (i) the detection or estimation of the stop intention by the stop intention detector and (ii) the detection or estimation of the unable-to-drive state by the unable-to-drive state detector.

2. The stop control device according to claim 1, further comprising
a driving operation detector that detects whether or not a driving operation component of the vehicle is operated,
wherein the unable-to-drive state detector estimates the unable-to-drive state of the driver in a case where the driving operation detector detects that the driving operation component is not operated for a predetermined time period or more.

3. The stop control device according to claim 1, further comprising
a vehicle velocity detector that detects a vehicle velocity of the vehicle,
wherein, when the stop intention is detected or estimated by the stop intention detector or when the unable-to-drive state is detected or estimated by the unable-to-drive state detector, the automatic stop controller increases the first deceleration in accordance with an increase in the vehicle velocity detected by the vehicle velocity detector.

4. The stop control device according to claim 1, further comprising:
a driving operation detector that detects whether or not a driving operation component of the vehicle is operated; and
a vehicle velocity detector that detects a vehicle velocity of the vehicle,
wherein the automatic stop controller:
performs the automatic stop control by using the second deceleration in a case where the driving operation detector detects that the driving operation component is in a non-operating state for a predetermined second time period or more during a first predetermined time period after the stop intention has been detected or estimated by the stop intention detector, and
releases the automatic stop control in a case where the driving operation detector does not detect that the driving operation component is in a non-operating state for the predetermined second time period or more during the first predetermined time period after the stop intention has been detected or estimated by the stop intention detector, and
wherein when the stop intention is detected or estimated by the stop intention detector, the automatic stop controller increases the first predetermined time period in accordance with an increase in the vehicle velocity detected by the vehicle velocity detector.

5. The stop control device according to claim 1, further comprising
an accelerator operation detector that detects whether or not an accelerator operation component of the vehicle is operated,
wherein the automatic stop controller interrupts the automatic stop control in a case where the accelerator operation detector detects that the accelerator operation component is operated during the automatic stop control, and releases the automatic stop control in a case where the accelerator operation detector detects that the accelerator operation component is continuously operated for a predetermined time period or more.

6. The stop control device according to claim 4, wherein the automatic stop controller starts the automatic stop control by using the first deceleration when the stop intention has been detected or estimated by the stop intention detector, and
releases the automatic stop control in the case where the driving operation detector does not detect that the driving operation component is in the non-operating state for the predetermined second time period or more during the first predetermined time period after the stop intention has been detected or estimated by the stop intention detector.

7. The stop control device according to claim 5, wherein the automatic stop controller resumes the automatic stop control in a case where the accelerator operation detector does not detects that the accelerator operation component is continuously operated for a predetermined time period or more.

8. A stop control method for controlling stop of a vehicle, comprising steps of:
detecting or estimating a stop intention made through an operation other than a braking operation;
detecting or estimating an unable-to-drive state of a driver of the vehicle, the unable-to-drive state being a state of the driver who is not able to drive the vehicle; and
performing, by using a computer, automatic stop control of the vehicle by using a brake system,
wherein the step of performing:
performs the automatic stop control by decelerating the vehicle by using a first deceleration in response to (i) detecting or estimating the stop intention or (ii) detecting or estimating the unable-to-drive state, and
performs the automatic stop control by decelerating the vehicle by using a second deceleration larger than the first deceleration in response to (i) detecting or estimating the stop intention and (ii) detecting or estimating the unable-to-drive state.

* * * * *